United States Patent
Kerns, Jr. et al.

(10) Patent No.: US 6,250,759 B1
(45) Date of Patent: Jun. 26, 2001

(54) EYEGLASS LENS WITH MULTIPLE OPTICAL ZONES HAVING VARYING OPTICAL PROPERTIES FOR ENHANCED VISUALIZATION OF DIFFERENT SCENES IN OUTDOOR RECREATIONAL ACTIVITIES

(75) Inventors: David V. Kerns, Jr., Waltham, MA (US); J. Paul Moore, Leawood, KS (US)

(73) Assignee: PeakVision, LLC, Nashville, TN (US)

( * ) Notice: Subject to any disclaimer, the term of this patent is extended or adjusted under 35 U.S.C. 154(b) by 0 days.

(21) Appl. No.: 09/469,916

(22) Filed: Dec. 22, 1999

(51) Int. Cl.[7] .................................................. G02C 7/10
(52) U.S. Cl. ............................ 351/165; 351/44; 351/163
(58) Field of Search .............................. 351/41, 44, 159, 351/163–165, 168–169, 49

(56) References Cited

U.S. PATENT DOCUMENTS

| | | | |
|---|---|---|---|
| 3,034,403 | 5/1962 | Neefe | 88/54 |
| 4,252,421 | 2/1981 | Foley, Jr. | 351/162 |
| 4,537,479 | * 8/1985 | Shinohara et al. | 351/169 |
| 4,576,453 | 3/1986 | Borowsky | 351/162 |
| 4,666,640 | 5/1987 | Neefe | 264/2 |
| 4,669,834 | 6/1987 | Richter | 351/162 |
| 4,681,412 | 7/1987 | Lemelson | 351/162 |
| 4,707,236 | 11/1987 | Borowsky | 204/182 |
| 4,840,477 | 6/1989 | Neefe | 351/162 |
| 4,915,495 | * 4/1990 | Takeuchi | 351/49 |
| 5,059,018 | 10/1991 | Kanome et al. | 351/162 |
| 5,235,358 | 8/1993 | Mutzhas et al. | 351/163 |
| 5,252,997 | * 10/1993 | Christenbery | 351/49 |
| 5,302,978 | 4/1994 | Evans | 351/162 |
| 5,414,477 | 5/1995 | Jahnke | 351/162 |
| 5,432,568 | * 7/1995 | Betz et al. | 351/45 |
| 5,434,630 | 7/1995 | Bransome | 351/162 |
| 5,592,245 | 1/1997 | Moore et al. | 351/163 |
| 5,617,154 | 4/1997 | Hoffman | 351/162 |
| 5,662,707 | 9/1997 | Jinkerson | 623/6 |
| 5,790,226 | * 8/1998 | Pollak | 351/54 |
| 5,864,380 | * 1/1999 | Umeda | 351/169 |
| 5,975,695 | * 11/1999 | Baiocchi et al. | 351/163 |
| 6,056,397 | * 5/2000 | Berlad | 351/44 |

FOREIGN PATENT DOCUMENTS 2622984   11/1997   (FR).

OTHER PUBLICATIONS

A Shade Made for Tennis, *Tennis*, Aug., 1998.

* cited by examiner

Primary Examiner—Jordan M. Schwartz
(74) Attorney, Agent, or Firm—Waddey & Patterson; Mark J. Patterson

(57) ABSTRACT

A lens for eyeglasses is provided with two or more optical zones on the lens body having different optical properties that enhance visualization of different scenes, including target objects within the scenes, that are associated with a specific recreational activity such as golf, hunting, or fishing. A first optical zone in an upper portion of the lens can be provided with pre-defined focus distance, transmission percentage, and/or transmission spectrum parameters for enhanced visualization of distant scenes associated with the specific recreational activity. A second optical zone in a lower portion of the lens can be provided with different pre-defined focus distance, transmission percentage, and/or transmission spectrum parameters for enhanced visualization of close-in scenes associated with the specific recreational activity.

15 Claims, 3 Drawing Sheets

EYEGLASS LENS WITH MULTIPLE OPTICAL ZONES HAVING VARYING OPTICAL PROPERTIES FOR ENHANCED VISUALIZATION OF DIFFERENT SCENES IN OUTDOOR RECREATIONAL ACTIVITIES

BACKGROUND OF THE INVENTION

The present invention relates generally to wearable optics for outdoor sporting and recreational activities. More particularly, this invention relates to eyeglass lenses having optical properties optimized for outdoor sporting and recreational activities.

In many sporting or recreational activities, such as golfing, fishing, or hunting, the participant needs to visualize different scenes, including target objects within such scenes, that are typically associated with that activity. The color spectra and ambient lighting associated with different target objects and scenes in recreational activities can vary, whereby a light filtering lens on an eyeglass should provide preferential viewing for certain color spectra under certain light intensity conditions to accommodate a specific scene typically encountered while participating in the activity. Using golf as an example, a scene whereby the shapes and undulations of a green putting surface being studied while preparing to putt would require different filtering properties for the lens as compared to watching a white ball flying through the air against a bright sky background. Although sunglasses exist that provide a variation in total light transmittance from a top portion of the lens to the bottom portion, such prior art lenses are often configured as standard neutral density filters with UV protection. They do not provide varying optical properties that provide preferential viewing to the wearer of the different color spectra associated with different scenes.

Similarly, these different target objects or scenes often exist at distances that vary between scenes or objects in a relatively consistent manner. For example, during a round of golf, the golfer will often have to locate a target green and flag stick at distances from 200–350 yards away. During that same round, the same golfer will be putting after inspecting the shape and topology of a green from a distance of a few yards. If the golfer wears glasses, the focus distances for each of the repetitive scenes are different. However, there are no eyeglasses available that are optimized for focusing at these distances. Conventional bifocals are intended to provide near focus distance for reading a book, not for reading a green or standing over a golf ball.

In other recreational activities such as fishing, having a lens that incorporates different optical zones having different polarization properties can also be beneficial.

What is needed, then, is an eyeglass lens that provides a visual perception to the wearer that can vary depending on: (1) the distance between the wearer and the object being viewed; (2) the color spectra of the viewed objects and related foreground and background scenes; (3) the ambient lighting conditions; and/or light polarization.

SUMMARY OF THE INVENTION

The novel eyeglass lens of this invention overcomes the deficiencies of the prior art by providing a lens body that includes one or more optical zones having one or more optical properties optimized for use in specific sporting and/or outdoor activities. The different optical zones are positioned within or on the body of the lens such that changes in orientation of the head, or a change in position or size of the pupil of the wearer's eye with respect to the lens and different scenes (including target objects) can vary the optical properties of the lens as perceived by the wearer, including focus distance, total visible light transmittance, visible light transmission spectrum, and/or polarization.

In one embodiment of the invention, an eyeglass lens has a lens body with a first optical zone positioned in an upper portion of the lens body, adjacent to a second optical zone positioned in a lower portion of the lens body. The first optical zone has a first focus property that allows the wearer to preferentially view a second typical distant scene associated with golf, such as a locating the green and flagstick prior to driving or hitting a long iron off the fairway. The second optical zone has a second focus property that allows the wearer to preferentially view a first typical close-in scene associated with a specific recreational activity, such as observing the shapes and curves of a golf green while putting. When the user (i.e., a golfer) is preparing to drive, he typically will rotate his eyes upward to look down the fairway towards the target area. This eye movement will orient the pupil of the eye so that most of the light reflected from the distant target scene will pass through the upper or first optical zone. When putting or preparing to putt, or when addressing the ball to drive, the golfer will typically re-position the pupil of the eye downward so that a greater percentage of the light reflected from the close-in scene will pass through the lower, second optical zone. This will allow the golfer to more precisely focus on objects and backgrounds in such a close-in scene.

Further, the first and second optical zones can also have different color filtering properties, i.e., different visible light transmission spectra. The transmission spectra for the first optical zone can be optimized so that a white golf ball in flight against a brightly lit sky background is easier to see. The color filter property of the second optical zone can be optimized so that changes in the shape or slope of the putting green when viewed from a close in location and under lower intensity light are more easily observed. The differences in color filter properties between the first and second filter zones thus can include variations in filter spectra as well as variations in total light transmittance through that portion of the lens. Accordingly, as the golfer's eyes change orientation as they are rotated up and down with respect to the position of the lens, the arrangement of the first and second optical zones provides both a focus property and a color filter property that are optimized for different scenes, including specific objects, backgrounds, and foregrounds.

The different optical zones in the lens can be arranged in a typical bifocal fashion, with an abrupt line or gradual transition between an upper and a lower zone. Alternatively, the second optical zone can be an oval or circle positioned in a specific location within the lens body.

DESCRIPTION OF THE PREFERRED EMBODIMENTS

Figure 1:
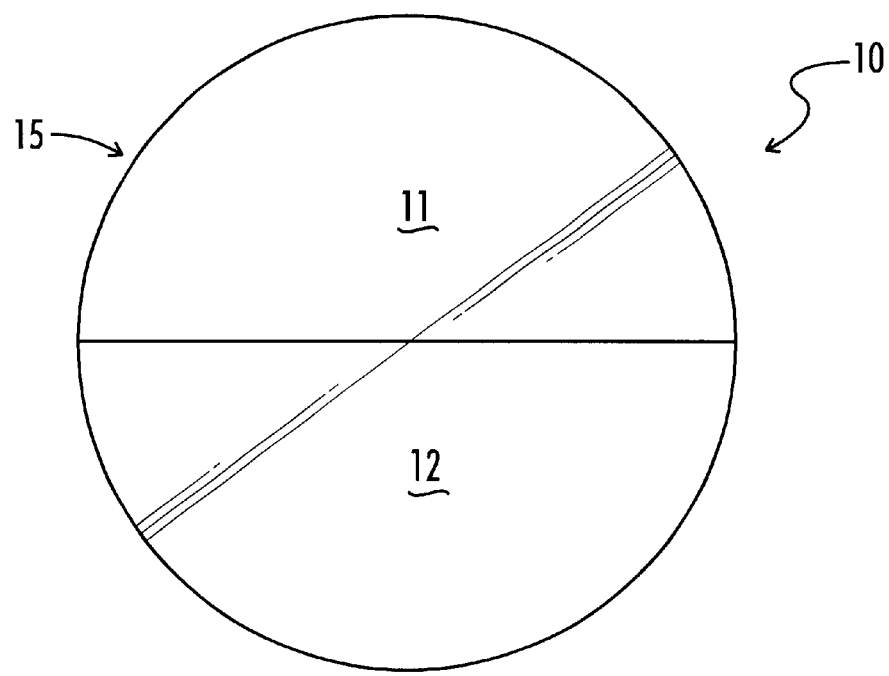
FIG. 1 is a plan view of a first embodiment of the lens of the present invention having a lens body with an over and under arrangement of first and second optical zones having a step transition in optical properties.

Referring to FIG. 1, a first embodiment of an eyeglass lens 10 includes a conventionally shaped lens body 15 having a first optical zone 11 located in an upper portion of the lens body 15. The first optical zone 11 is provided with one or more optical properties to allow a wearer of the lens 10 to preferentially view a first typical scene (including objects, backgrounds, and/or foregrounds) associated with a specific outdoor recreational activity, such as golf, hunting, or fishing. Thus, the first optical zone 11 can be clear or can be treated with a dye or interference coating to provide desired parameters for transmission percentage and transmission spectrum properties for light at various visible wavelengths. Similarly, the first optical zone 11 can be manufactured in a conventional manner to provide ideal focus at a distance range associated with the first typical scene. For example, the first optical zone 11 can provide optimum focus for targeting a flagstick on a golf green located 200 yards from the wearer, and can provide color light filtering that provides preferential viewing of a white golf ball against a bright sky background, as shown in FIG. 7.

Figure 4:
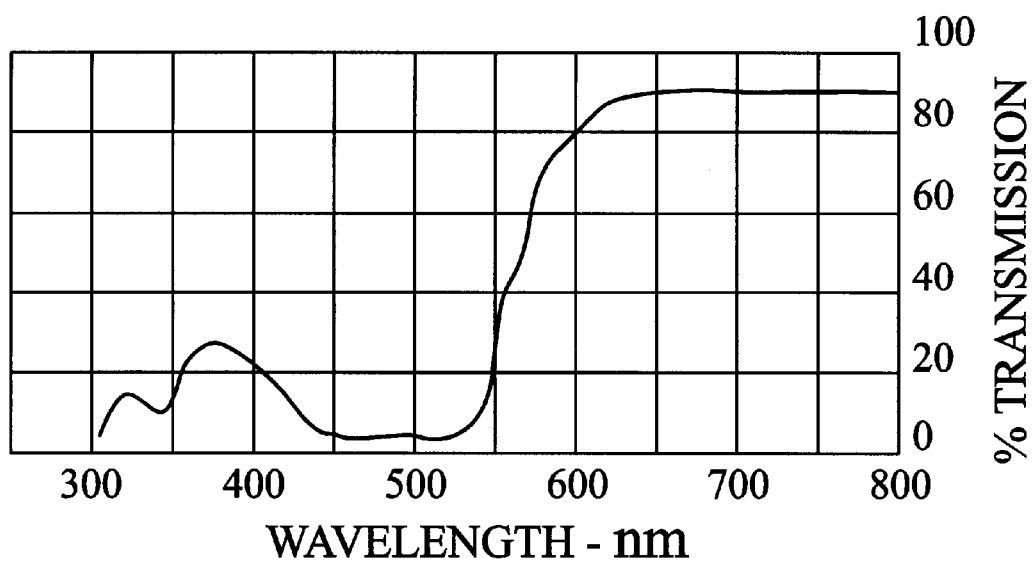
FIG. 4 is a graph showing visible light transmittance and visible light transmission spectrum properties for an amber tinted filter used in the second optical zone in a lens of the invention as shown in FIG. 1, optimized for putting a golf ball on a green putting surface.

Located immediately below the first optical zone 11 is a second optical zone 12 that provides preferential viewing of a second typical scene associated with the same recreational activity. For example, the second optical zone 12 can be manufactured in a conventional manner to provide optimum focusing at short range, such as the distance to a golf ball during address for putting or driving. The second optical zone 12 is also provided with different parameters for transmission percentage and transmission spectrum properties to transmit a greater percentage of the total visible light as compared to the first optical zone 11, and for filtering certain visible wavelengths, as shown in FIG. 4, to preferentially view the shapes and undulations of a putting green. Accordingly, as the wearer of the eyeglasses equipped with the lens 10 rotates the pupils of his eyes upward and downward to observe the different scenes typically encountered during a specific recreational activity, the pupils of the wearer's eyes are visually aligned with the first or second optical zone that provides enhanced visualization of two or more different scenes associated with that activity.

Figure 7:
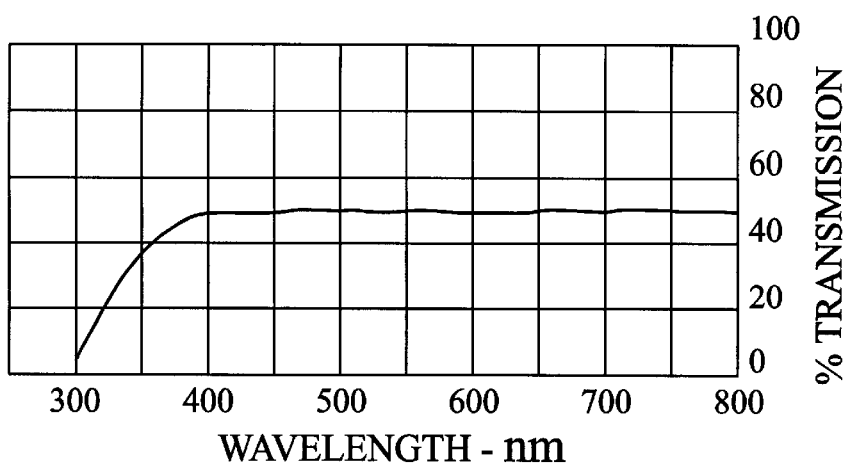
FIG. 7 is a graph showing visible light transmittance and visible light transmission spectrum properties for a neutral density filter with UV protection as used in the first optical zone in a lens of the invention as shown in FIG. 1.

FIGS. 1, 4, and 7 illustrate an embodiment of the lens of this invention that is adapted for enhanced visualization of different scenes associated with golf. The first optical zone 11 is located in the upper portion of the lens body 15, corresponding to the portion used for distant vision. As shown in FIG. 7, the transmission percentage and transmission spectrum properties for the first optical zone 11 approximately define a neutral density sunglass filter, gray in color, and having a total light transmission percentage that is substantially less than 100% and approximately constant over the visible wavelengths. Preferably, the transmission percentage decreases substantially as shown in FIG. 7 for light having wavelengths less than 400 nm, to provide UV protection. The second optical zone 12 is located in a lower portion of the lens body 15, corresponding to the portion of the lens body 15 through which closer scenes are viewed, particularly when the golfer is looking downward when studying a green or striking the ball. The parameters for the transmission percentage and transmission spectrum properties in the second optical zone 12 are selected to provide enhanced visualization of the shapes and contours of a green putting surface. As shown in FIG. 4, an amber (or cinnamon) tinted sunglass filter can provide this effect. Thus, the first (upper) optical zone 11 with a neutral density filter provides an excellent sunglass function with enhanced visualization of a white golf ball against a blue or a gray sky. Also, by using a neutral density filter, changes in distance perception are minimized, which can occur when using colored filters. The amber tinted filter forming the second optical zone 12 at the bottom of the lens body 15 comes primarily into use when the golfer is looking downward at the green for putting. An amber tinted filter increases perception of the curves and contours of the green or putting surface. Optionally, the parameters for the focus distance property can be varied in a step transition between the first and second optical zones 11 and 12, corresponding to the typical distances from the golfer to the backgrounds and objects associated with the different golfing scenes.

Figure 5:
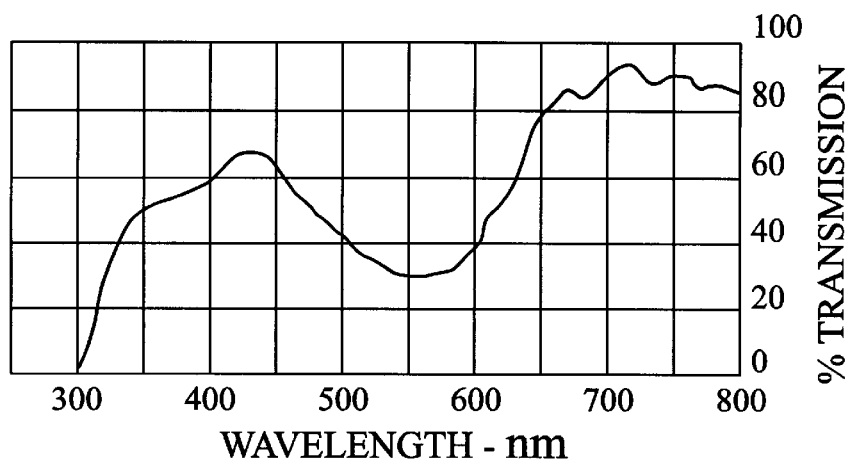
FIG. 5 is a graph showing visible light transmittance and visible light transmission spectrum properties for an lavender tinted filter used in the second optical zone in a lens of the invention as shown in FIG. 1, optimized for hunting.

A lens optimized for use in hunting glasses is shown in FIGS. 1, 5, and 7. Again, the first optical zone 11 in the upper portion of the lens body 15 provides a neutral density (approximately gray) filter (FIG. 7), and functions as a conventional sunglass without tinting of the background which can alter distance perception. Proper distance perception is important in hunting when aiming a gun or bow at distant objects. The second optical zone 12 in a lower portion of the lens body 15 is provided with transmission percentage and transmission spectrum property parameters that enhance visual perception of red colored objects against different backgrounds. A lavender tinted filter having the transmission spectrum graphed in FIG. 5 can provide this enhancement. The transmission percentage increases to a relatively high level for light having wavelengths between 650 and 710 nm, the wavelengths that correspond to red colors. The filter in the second optical zone 12 attenuates orange, yellow and green wavelengths but provides a transmission peak in the blue region as shown in FIG. 7. The combination of red and blue tints creates a lavender tint as perceived by the user, but wavelengths corresponding to red are transmitted, and stand out against the lavender background. Such a combination of optical properties is useful in tracking a wounded animal, in that while looking downward (through the second optical zone 12 in the lower portion of the lens body 15) blood drops are more clearly discerned. Again, the first and second optical zones 11 and 12 can be provided with different focus distance parameters, for focusing on objects at longer and shorter distances respectively.

Figure 6:
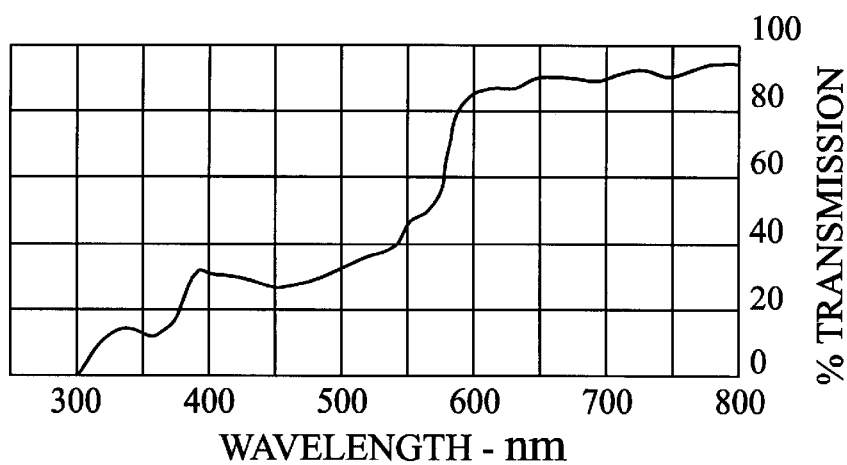
FIG. 6 is a graph showing visible light transmittance and visible light transmission spectrum properties for an orange tinted filter used in the second optical zone in a lens of the invention as shown in FIG. 1, optimized for fishing.

Yet another embodiment of the lens 10 is shown in FIGS. 1, 6, and 7, for enhanced visualization of different scenes encountered while fishing. The first optical zone 11 in the upper portion of the lens body 15 has neutral density (gray) transmission percentage and transmission spectrum parameters shown in FIG. 7 or is provided with another color tint to create a useful sunglass effect when viewing objects at a distance. Optionally, the first optical zone 11 is not polarized so that reflections from wave tops on the surface of the water being fished are not diminished. This can be important when the user is looking for ripples and surface reflections that may indicate the presence of schools of fish below the surface. The second optical zone 12 in the lower portion of the lens body 15 provides different optical property parameters that enhance visualization of objects at short range and beneath the water. This enables the fisherman to better "see" the fish or other submerged objects. A filter with an orange tint, with visible light transmission percentages and spectrum parameters such as that shown in FIG. 6 enhances the visualization of objects submerged in water. Also, the second optical zone 12 can be conventionally polarized with a polarization orientation that will reduce surface reflections and enable the fisherman to see objects beneath the surface of water at close range.

Figure 2:
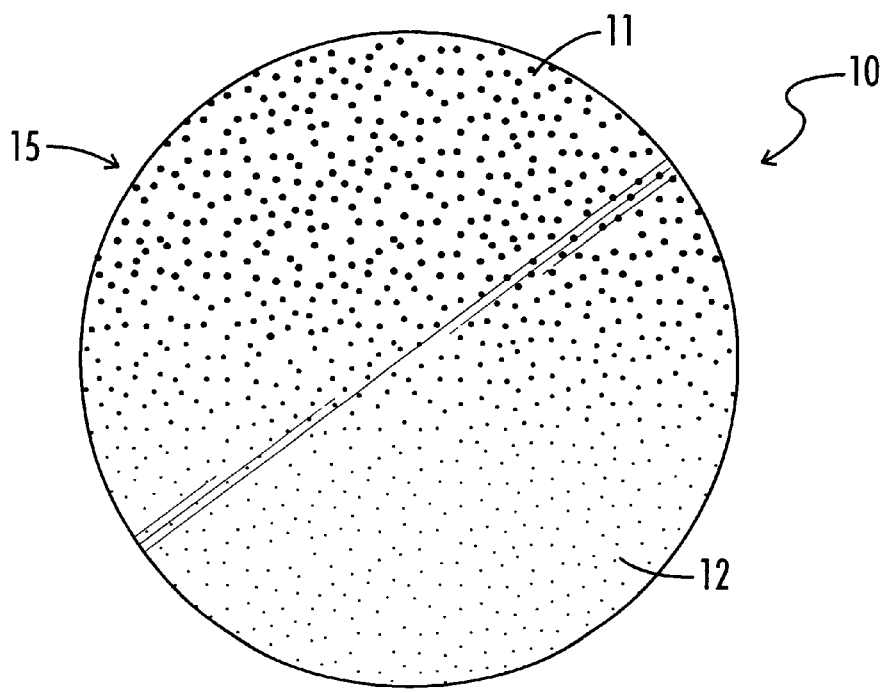
FIG. 2 is a plan view of a second embodiment of the invention in which there is a gradual transition in optical properties between the upper and lower optical zones.

FIG. 2 shows an embodiment of the lens 10 of this invention in which there is gradual transition in parameters associated with one or more optical properties, rather than a step or line transition as shown in FIG. 1. For example, the lens 10 shown in FIG. 2 can have a transmission percentage of total visible light that gradually increases from the top to the bottom of the lens body 15, with a corresponding gradual change in color tint, such as from a neutral density filter as in FIG. 7 to an amber tinted filter as shown in FIG. 4. Thus, a lens 10 of this invention with a gradual transition as shown in FIG. 2 essentially defines multiple optical zones. A similar effect can be provided in an embodiment having three or more adjacent optical zones with line or step transitions in optical property parameters between them.

Figure 3:
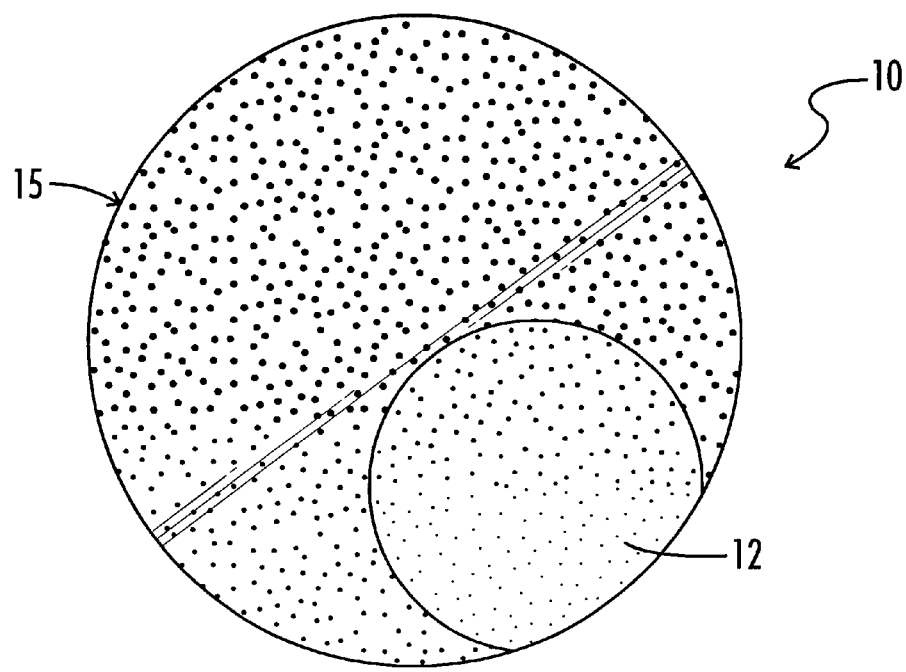
FIG. 3 is a plan view of a third embodiment of the invention in which the second optical zone is positioned in a specific location within the lens body, partially surrounded by the first optical zone.

FIG. 3 illustrates yet another embodiment of the lens 10 in which second optical zone 12 is smaller as compared to the first optical zone 11 that surrounds it and is positioned in a lower, inside corner of the lens body 15. Of course, the different optical zones can be sized, shaped, and positioned on the lens body 15 in a variety of ways not illustrated here, for purposes of providing enhanced visualization of specific scenes associated with specific recreational activities.

As mentioned above, one of the optical properties having parameters that can be changed between optical zones for enhanced visualization of certain scenes (including target objects within the scenes) associated with a specific recreational activity is focus distance. In some cases, it may be beneficial to optimize the focus distance of each optical zone to correspond to the needs of a particular wearer in addition to the requirements of the specific scenes. For example, magnification can be provided in one or more optical zones.

Thus, although there have been described particular embodiments of the present invention of a new and useful Eyeglass Lens With Multiple Optical Zones Having Varying Optical Properties for Enhanced Visualization of Different Scenes in Outdoor Recreational Activities, it is not intended that such references be construed as limitations upon the scope of this invention except as set forth in the following claims.

What is claimed is:

1. A lens for glasses worn over the eye of a user during a specific recreational activity comprising:
   a. a lens body;
   b. the lens body having at least first and second light transmissive optical zones, with each optical zone provided with one or more optical properties having parameters that vary from the first optical zone to the second optical zone;
   c. the variations in the parameters for the optical properties from the first to the second optical zones being pre-defined for enhancing visualization of two or more different scenes associated with the recreational activity;
   d. wherein the first optical zone is positioned in an upper portion of the lens body such that when the user is looking ahead at scenes that are relatively far from the user, the pupil of the user's eye is primarily visually aligned with the first optical zone;
   e. wherein the second optical zone is positioned in a lower portion of the lens body such that when the user is looking downward at scenes that are relatively close to the user, the pupil of the user's eye is primarily visually aligned with the second optical zone;
   f. wherein the parameters for each of the varying optical properties in the first optical zone are optimized for visualization of scenes that are relatively distant from the user and the parameters for each of the varying optical properties in the second optical zone are optimized for visualization of scenes that are relatively close to the user;
   g. wherein the varying optical properties comprise at least one of: focus distance, visible light transmission percentage, and visible light transmission spectrum;
   h. wherein the recreational activity is golf;
   i. wherein the parameters for the transmission spectrum and transmission percentage optical properties in the first optical zone define a neutral density sunglass filter in which transmission of light over all visible wavelengths is an approximately constant percentage that is substantially less than 100%; and
   j. wherein the parameters for the transmission spectrum and transmission percentage properties in the second optical zone define a sunglass filter that enhances visualization of curves and contours on a green putting surface.

2. The lens of claim 1 wherein the variations in the parameters for at least one of the optical properties from the first optical zone to the second optical zone are defined by a gradual transition between the optical zones.

3. The lens of claim 1 wherein the variations in the parameters for at least one of the optical properties from the first optical zone to the second optical zone are defined by a step transition between the optical zones.

4. The lens of claim 1 wherein the sunglass filter in the second optical zone is an amber tinted filter.

5. The lens of claim 1 wherein the transmission percentage of total visible light is greater in the second optical zone as compared to the first optical zone.

6. A lens for glasses worn over the eye of a user during a specific recreational activity comprising:
   a. a lens body;
   b. the lens body having at least first and second light transmissive optical zones, with each optical zone provided with one or more optical properties having parameters that vary from the first optical zone to the second optical zone;
   c. the variations in the parameters for the optical properties from the first to the second optical zones being pre-defined for enhancing visualization of two or more different scenes associated with the recreational activity;
   d. wherein the first optical zone is positioned in an upper portion of the lens body such that when the user is looking ahead at scenes that are relatively far from the user, the pupil of the user's eye is primarily visually aligned with the first optical zone;

e. wherein the second optical zone is positioned in a lower portion of the lens body such that when the user is looking downward at scenes that are relatively close to the user, the pupil of the user's eye is primarily visually aligned with the second optical zone;

f. wherein the parameters for each of the varying optical properties in the first optical zone are optimized for visualization of scenes that are relatively distant from the user and the parameters for each of the varying optical properties in the second optical zone are optimized for visualization of scenes that are relatively close to the user;

g. wherein the varying optical properties comprise at least one of: focus distance, visible light transmission percentage, and visible light transmission spectrum;

h. wherein the recreational activity is hunting;

i. wherein the parameters for the transmission spectrum and transmission percentage properties in the first optical zone define a neutral density sunglass filter in which transmission of light over all visible wavelengths is an approximately constant percentage that is substantially less than 100%; and j. wherein the parameters for the transmission spectrum and transmission percentage properties in the second optical zone define a sunglass filter that enhances visual perception of red colored objects.

7. The lens of claim 6 wherein the sunglass filter in the second optical zone is a lavender tinted filter.

8. The lens of claim 6 wherein the transmission percentage of total visible light is greater in the second optical zone as compared to the first optical zone.

9. The lens of claim 6 wherein the variations in the parameters for at least one of the optical properties from the first optical zone to the second optical zone are defined by a gradual transition between the optical zones.

10. The lens of claim 6 wherein the variations in the parameters for at least one of the optical properties from the first optical zone to the second optical zone are defined by a step transition between the optical zones.

11. A lens for glasses worn over the eye of a user during a specific recreational activity comprising:

a. a lens body;

b. the lens body having at least first and second light transmissive optical zones, with each optical zone provided with one or more optical properties having parameters that vary from the first optical zone to the second optical zone;

c. the variations in the parameters for the optical properties from the first to the second optical zones being pre-defined for enhancing visualization of two or more different scenes associated with the recreational activity;

d. wherein the first optical zone is positioned in an upper portion of the lens body such that when the user is looking ahead at scenes that are relatively far from the user, the pupil of the user's eye is primarily visually aligned with the first optical zone;

e. wherein the second optical zone is positioned in a lower portion of the lens body such that when the user is looking downward at scenes that are relatively close to the user, the pupil of the user's eye is primarily visually aligned with the second optical zone;

f. wherein the parameters for each of the varying optical properties in the first optical zone are optimized for visualization of scenes that are relatively distant from the user and the parameters for each of the varying optical properties in the second optical zone are optimized for visualization of scenes that are relatively close to the user;

g. wherein the varying optical properties comprise at least one of: focus distance, visible light transmission percentage, and visible light transmission spectrum;

h. wherein the recreational activity is fishing;

i. wherein the parameters for the transmission percentage and transmission spectrum properties in the first optical zone define a neutral density sunglass filter in which transmission of light over all visible wavelengths is an approximately constant percentage that is substantially less than 100%; and j. wherein the parameters for the transmission percentage and transmission spectrum properties in the second optical zone define a sunglass filter that enhances visualization of objects that are submerged in water.

12. The lens of claim 11 wherein the sunglass filter in the second optical zone is an orange tinted filter.

13. The lens of claim 11 wherein the varying optical properties in the first and second optical zones further include polarization and wherein the parameter for the polarization property in the first optical zone defines a non-polarized filter and wherein the parameter for the polarization property in the second optical zone defines a polarized filter.

14. The lens of claim 11 wherein the variations in the parameters for at least one of the optical properties from the first optical zone to the second optical zone are defined by a gradual transition between the optical zones.

15. The lens of claim 11 wherein the variations in the parameters for at least one of the optical properties from the first optical zone to the second optical zone are defined by a step transition between the optical zones.

* * * * *